United States Patent
Scanlon

(10) Patent No.: US 10,880,690 B2
(45) Date of Patent: Dec. 29, 2020

(54) MULTI-AXIS TEMPORAL MOTION ACCELERATION DETECTION FOR DEVICE PERFORMANCE MONITORING

(71) Applicant: BBY SOLUTIONS, INC., Richfield, MN (US)

(72) Inventor: Mark Scanlon, Bloomington, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 16/554,176

(22) Filed: Aug. 28, 2019

(65) Prior Publication Data

US 2020/0084581 A1    Mar. 12, 2020

Related U.S. Application Data

(60) Provisional application No. 62/729,018, filed on Sep. 10, 2018.

(51) Int. Cl.
| | |
|---|---|
| H04W 24/00 | (2009.01) |
| H04W 4/02 | (2018.01) |
| G06F 17/14 | (2006.01) |
| H04W 4/80 | (2018.01) |
| H04L 29/08 | (2006.01) |
| G06F 17/15 | (2006.01) |

(52) U.S. Cl.
CPC ............ *H04W 4/027* (2013.01); *G06F 17/14* (2013.01); *G06F 17/15* (2013.01); *H04L 67/125* (2013.01); *H04W 4/80* (2018.02)

(58) Field of Classification Search
USPC ............ 455/456.1, 456.2, 456.3, 456.4, 67.1
See application file for complete search history.

(56) References Cited

U.S. PATENT DOCUMENTS

| | | | |
|---|---|---|---|
| 7,574,918 B2 | 8/2009 | Popescu | |
| 2011/0271761 A1 | 11/2011 | Grieu | |
| 2012/0259476 A1* | 10/2012 | Trieb | G06F 1/28 700/295 |
| 2014/0025256 A1 | 1/2014 | Armitage | |
| 2014/0316585 A1* | 10/2014 | Boesveld | G05D 23/1905 700/278 |
| 2017/0030798 A1* | 2/2017 | DeVerse | G06F 19/00 |
| 2017/0289257 A1* | 10/2017 | Colston | G06Q 30/012 |
| 2018/0254096 A1* | 9/2018 | Karunanithi | A61B 5/746 |
| 2019/0196893 A1* | 6/2019 | Lee | G06F 11/0709 |

* cited by examiner

*Primary Examiner* — David Q Nguyen
(74) *Attorney, Agent, or Firm* — Tysver Beck Evans, PLLC

(57) ABSTRACT

A system and method are presented that monitor components of an appliance for predicted, future failures. A sensor element is attached to the appliance to obtain movement and magnetic field data from the appliance. The sensor element can be attached to the metal shell of the appliance. A base sensor component receives data from the sensor element, and then divides individual signals into sub-frequencies. In one embodiment, 3-D signals relevant to position change, acceleration, and detected electromagnetic field at the sensor are all analyzed by the base sensor, along with a current draw signal for the appliance. Changes in the signals are reported to a server, that compares changes to a prepopulated database. This database correlates changes in sensor signals with predicted failures of appliance components. Identified components with a predicted, future failure are replaced before the failure.

11 Claims, 11 Drawing Sheets

MULTI-AXIS TEMPORAL MOTION ACCELERATION DETECTION FOR DEVICE PERFORMANCE MONITORING

FIELD OF THE INVENTION

The present invention relates to the utilization of movement, current draw, and electromagnetic field sensors to repair failing components in a household appliance or other device.

SUMMARY

Any household appliance, such as a refrigerator, a dishwasher, a washing machine, or a clothes dryer, is assembled from a variety of mechanical components. Example components may include an electric motor, a heating element, a compressor, a fan, a drive belt, a turning drum, a solenoid, a mechanical valve, or a water pump. As mechanical devices, these components have characteristic movements or vibrations that occur when operating. As electric devices, the operation of these components draws power from an electric power supply, and will also likely create electromagnetic field fluctuations during operation. When the various components operate during use of the appliance, the entire appliance will have current draws, vibrations and movements, and electro-magnetic field fluctuations that reflect the operation of each of the individual components.

One embodiment of the present invention attaches movement, acceleration, and magnetic field sensors to the appliance. These sensors can be grouped together into a single sensor module, which is attached to the outer shell of the appliance. The remote sensor module communicates with a sensor base component. Preferably, this base component also monitors the current draw of the entire appliance.

The base component analyzes each of these input signals for changes in signal characteristics. If changes are detected, messages presenting or describing the changed signals are compressed and sent from the base to a remote server. The remote server analyzes the signals and compares the signals against a signal database for that appliance. The remote server compares the received signals and identifies the component (or components) of the appliance that is responsible for the changed signal. The changes/deviations in the signal are then compared in the database for known deviant signals that indicate a negative change-in-condition status for the appliance component. For instance, a higher current draw and an increase in X-axis and Z-axis vibrations of a particular pattern may indicate that a pump is deteriorating and is at risk of failure. If a potential component failure is identified, repair personnel are dispatched and the component is repaired or replaced before the component fails.

While much of the discussion herein describes the use of the present invention in the context of a household appliance, it is intended that the present invention could be used in other contexts as well. For example, the sensors and sensor base could be used to monitor an HVAC system that is used in a commercial setting.

DETAILED DESCRIPTION

Appliance Signals

Figure 1:
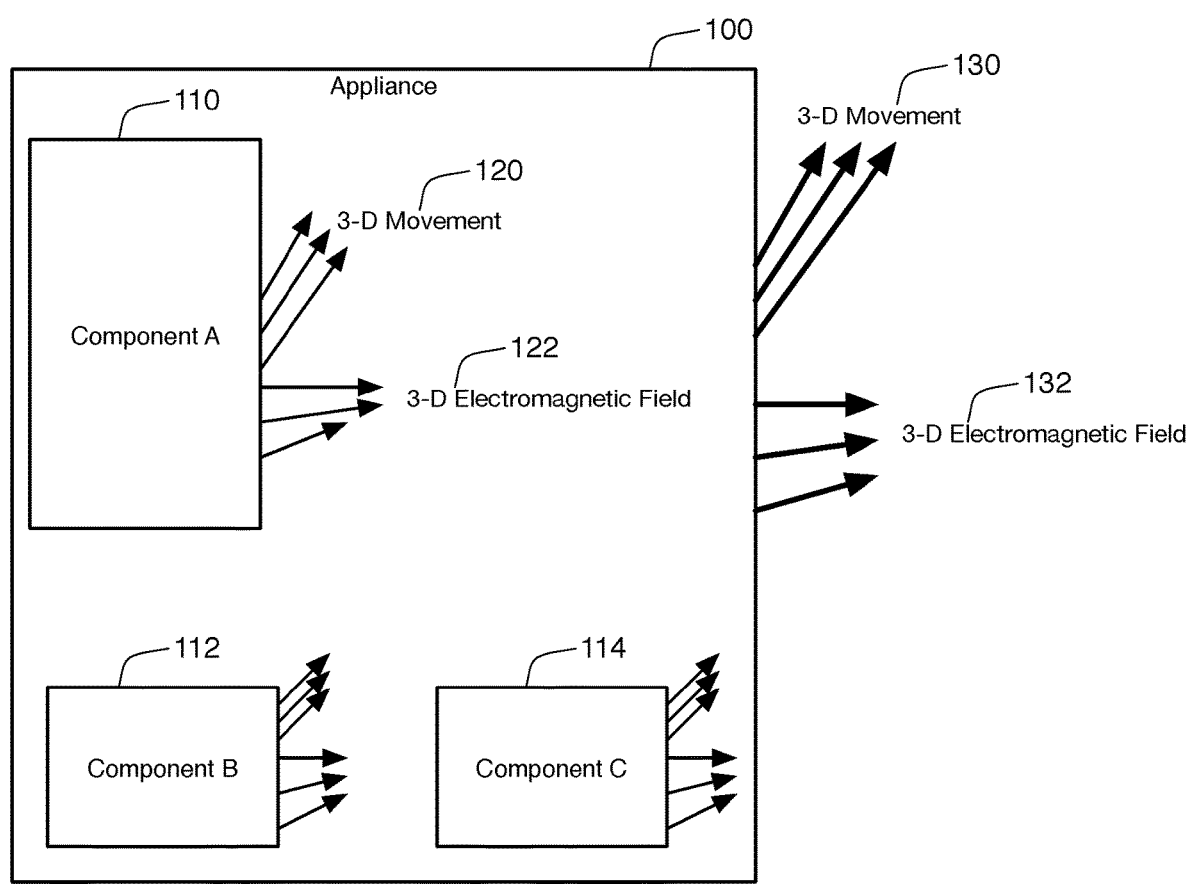
FIG. 1 is a schematic view of an appliance containing three components.

FIG. 1 shows a schematic view of an appliance 100 containing three separate components 110, 112, 114. In the description of the invention set forth below, this appliance 100 can take the form of a major household appliance, such as a refrigerator, a dishwasher, a kitchen range, an air conditioner, a washing machine, or a dryer. In most cases, an appliance 100 would have many more than three different components. Nonetheless, to simplify the discussion, the appliance 100 of FIG. 1 is shown with only three components 110, 112, and 114. Component A110 could be, for example, an electric motor, while component B112 might be a fan and component C114 might be a solenoid valve. In each of these examples, the components 110, 112, and 114 are mechanical in nature having moving parts, and are electrical in that they require an electric current to operate. In other embodiments, the appliance 100 could be replaced by another device that contains internal components having moving parts and electrical operation, such as a commercial HVAC system.

Using component A110 as an example, this component 110 will vibrate during operation, meaning that the component 110 will undergo physical motion. If the component 110 is an electric motor, the internal rotor will spin during operation. The motion contemplated in FIG. 1, however, is not this internal spinning, but the vibration of the entire component 110 caused by this spinning. Such whole-system (or "external") vibrations take the form of small physical movement of the entire component 110.

Because such vibrations occur in three-dimensions, these movements can be measured along three axes, usually referred to as the X-axis, the Y-axis, and the Z-axis. Because these physical movements occur over time, it is possible with the correct sensors to measure the change in position over time caused by these movements. With such measurements, it is also possible to calculate the acceleration of the component 110 and graph these changes over time. The movements or vibrations of component A110 are shown in FIG. 1 as the three movement lines 120 labeled as "3-D Movement." Each of the three lines indicate movement (position changes/velocity/acceleration) along one of the three axes of 3-D space.

In many cases, the movement of or within a component 110, 112, 114 can cause or interfere with an electromagnetic field. For instance, electric motors utilize a magnetic field, and the rotation of a rotor with an electric motor will cause its own changes in the electromagnetic field around the electric motor. Like vibratory motion, the electromagnetic field 122 resulting from the operation of component A110 is shown as three lines in FIG. 1 representation the three dimensions of 3-D space.

Component B112 and component C114 are also capable of movement/vibrations in 3 dimensions and of creating or altering electromagnetic fields in 3 dimensions. Consequently, FIG. 1 shows lines emanating from these components 112, 114 that are similar to the 3-D movement lines 120 and the 3-D electromagnetic field lines 122 emanating from component A110.

In almost all cases, the individual components 110, 112, 114 of an appliance 100 are physically secured to or within the interior of the appliance 100. Because of this physical connection, the 3-D movement or vibrations 120 of component 110 and the other components 112, 114 will inescapably cause movements or vibrations 130 in the appliance 100 as a whole. The vibrations 130 of the appliance 100 will not, however, be a simple addition of the movement vectors 120 of its components, since major components (such as motors, gears, and rotating drums) are likely attached to the appliance through dampening mechanisms intended to reduce the vibratory impact of the component 110, 112, 114 on the appliance 100 as a whole. Furthermore, harmonics and any resonance frequencies of the mechanical frame of the appliance 100 may also impact the 3-D movement 130 of the appliance. Nonetheless, it is clear that the 3-D movement 130 of the appliance 100 will be greatly influenced by the 3-D movement 120 of component A 110 and the other components 112, 114. Similarly, the 3-D electromagnetic field 122 of Component A110 and the other components 112, 114 within the appliance 100 will create a combined 3-D electromagnetic field 132 for the appliance 100 as a whole. This field 132 is detectable both within and outside of the appliance 100.

In FIG. 1, each dimension of 3-D movement 120, 130 or of the 3-D electromagnetic field 122, 132 are represented by a separate arrow. In practice, each arrow is a signal that has a changing magnitude or value over time. When this movement contains one or more periodic sub-elements, such as with a spinning electric motor, it will be possible to identify a period or frequency with which the movement or change in magnetic field is repeated. Such signals may have the appearance of a sine wave, with periodic increases and decreases in magnitude over time. The time between each peak or valley would describe the frequency of the signal. In most cases, signals representing movement of a component 110, 112, 114 or the appliance as a whole 100 may be influenced by multiple sources, each with its own frequency.

Figure 2:
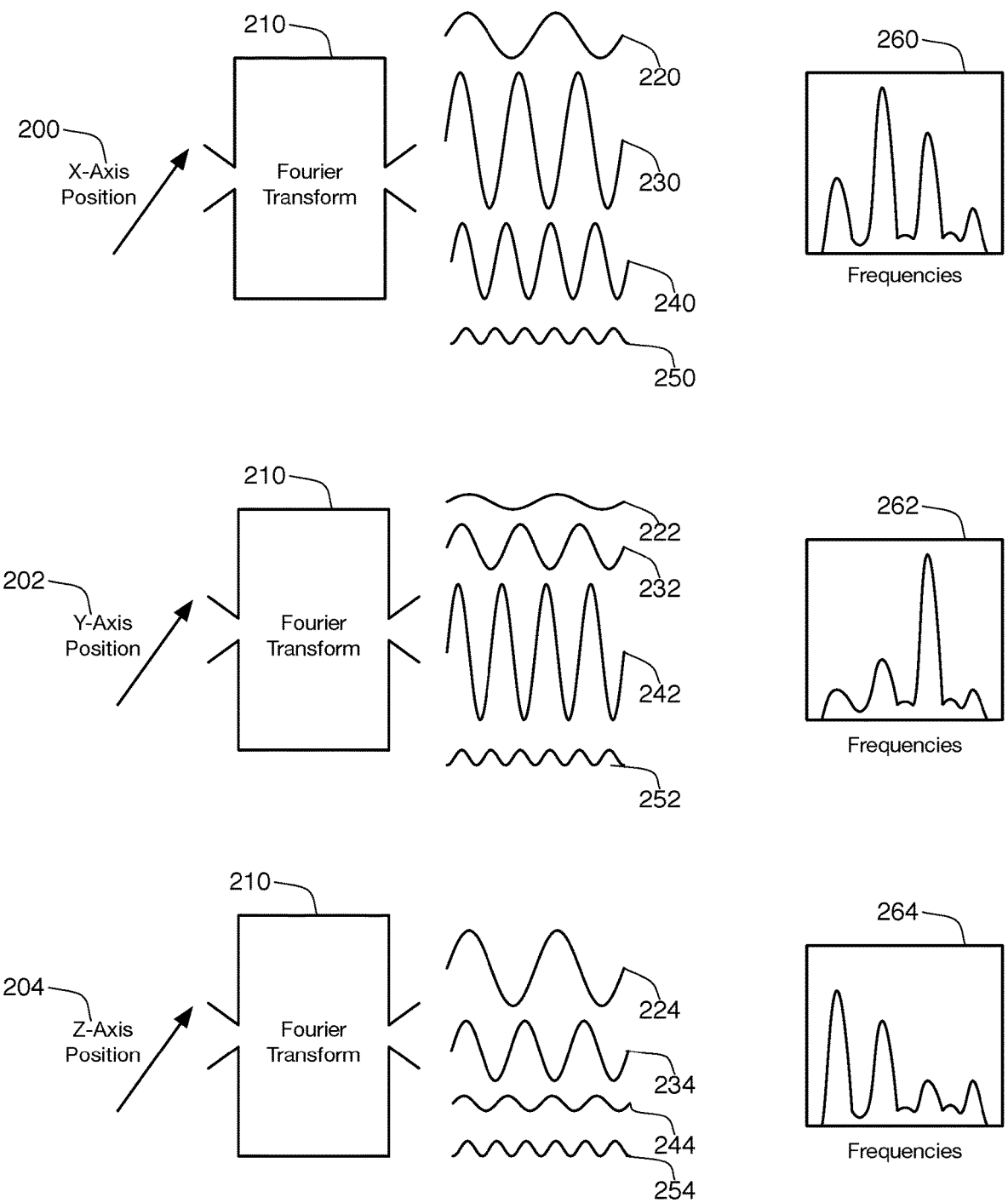
FIG. 2 is a schematic view showing the components of a 3-D position signal over time divided into constituent wavelengths through a Fourier transformation.

To help analyze these signals, it is possible to apply a Fourier transform to the signals to separate each frequency within a signal into a separate signal. FIG. 2 shows Fourier transforms 210 being applied to three different dimensions of a position signal, namely the X-Axis position signal 200, the Y-Axis position signal 202, and the Z-Axis position signal 204. A Fourier transformation is shown as a mathematical "black box" 210 in FIG. 2. Many possible techniques may be applied within these boxes 210. In one embodiment, a fast Fourier transform (FFT) such as Cooley-Tukey FFT method is used to convert a single dimension signal 200, 202, or 204 into separate frequency components. These separate components are shown as separate signals to the right of the Fourier transform box 210. In FIG. 2, the X-Axis position signal has been converted into four separate signals 220, 230, 240, 250, each with a different frequency. The amplitude of each signal 220, 230, 240, 250 differs based upon the amplitude of that frequency component within the original signal 200. Similarly, the Y-Axis position signal 202 is transformed into separate frequency signals 222, 232, 242, and 252; while the Z-Axis position signal 204 is transformed into signals 224, 234, 244, and 254. It is possible to graph the various frequencies (for instance, along the x-axis of a two-dimensional graph) against the amplitude of those frequency signals (along the y-axis), resulting in the frequency/amplitude graphs 260, 262, and 264 for the three input signals 200, 202, and 204, respectively.

It is possible (and perhaps even likely) that the amplitude of a particular frequency subcomponent, such as signal 220, will alter over time. This changing amplitude of a frequency subcomponent can be identified by analyzing the results of the Fourier transform over time.

Sensor System 300

Figure 3:
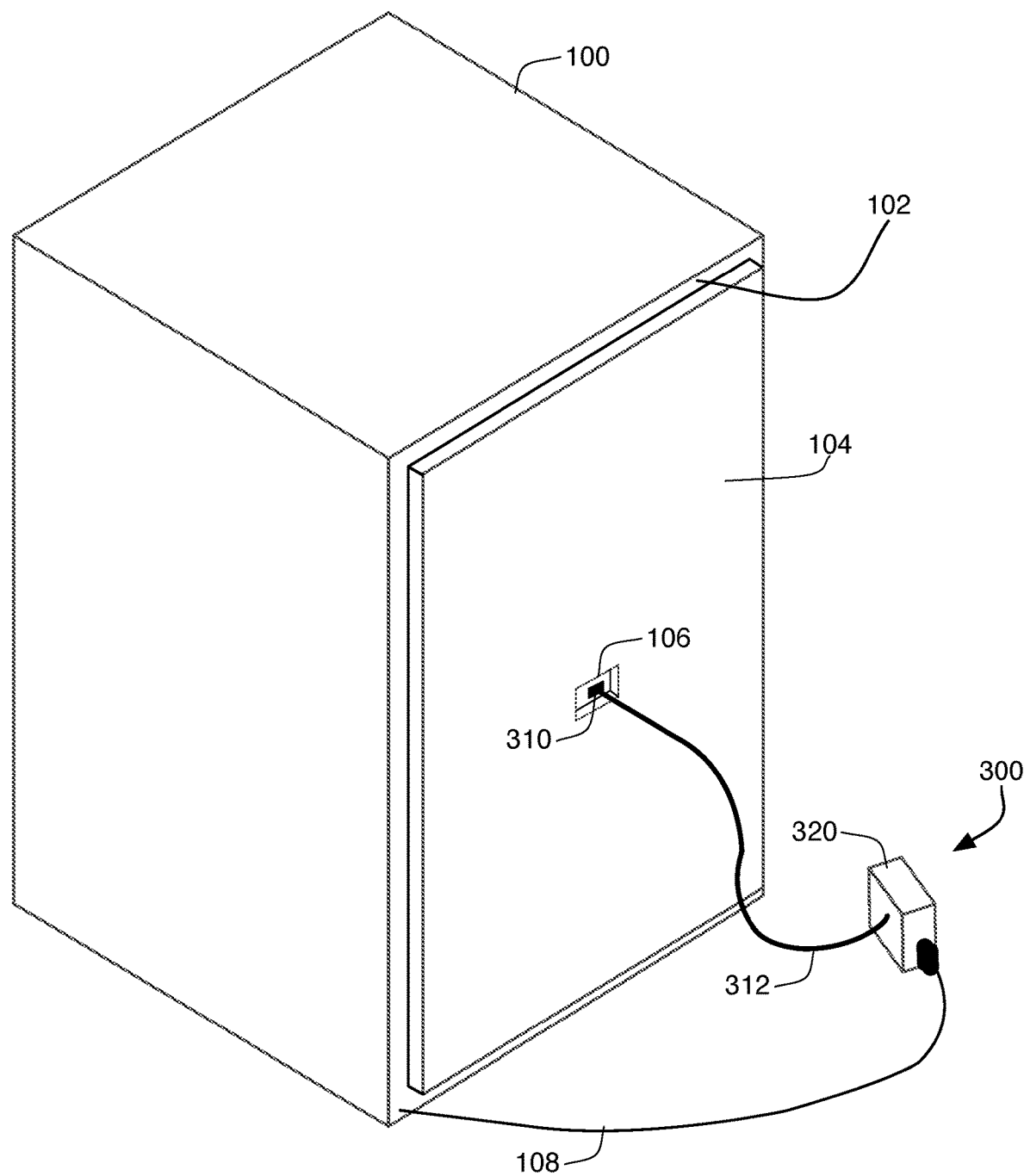
FIG. 3 is a perspective view of the appliance of FIG. 1 being monitored by a sensing apparatus.
Figure 4:
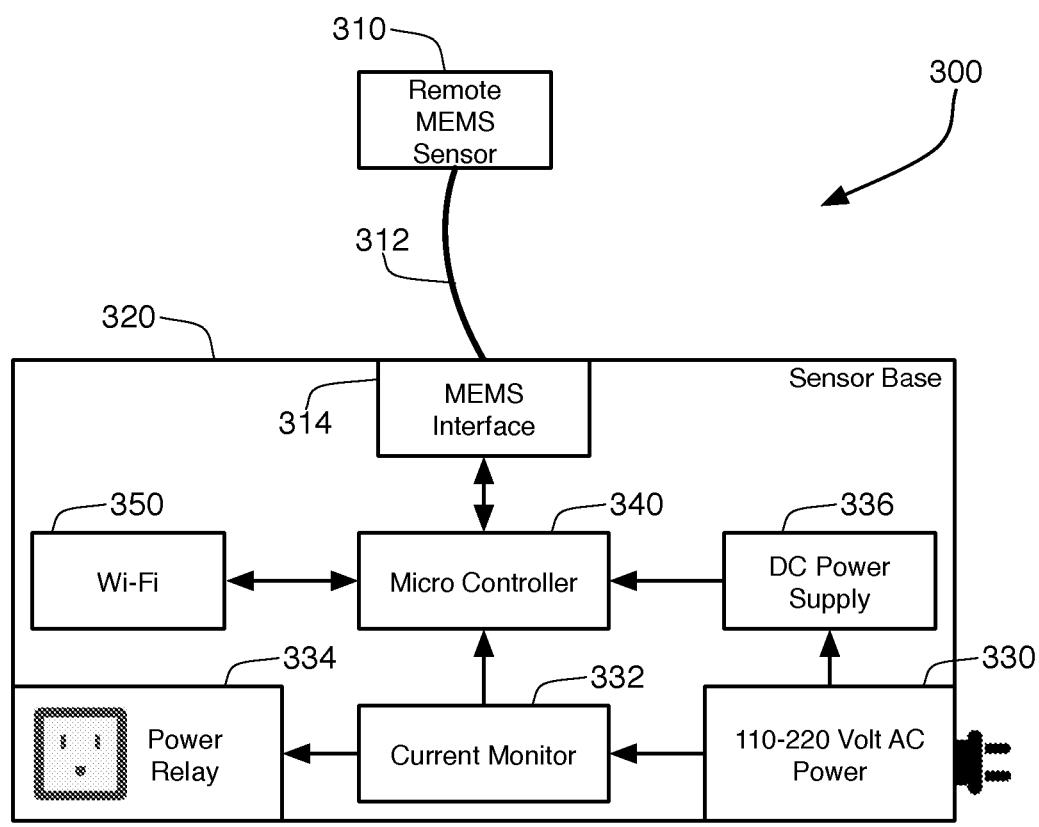
FIG. 4 is a schematic view of the major components of the sensing apparatus of FIG. 3.

In one embodiment, the sensor system 300 is attached to a wall 102 of the appliance 100 to measure the movement and acceleration of the appliance 100 as a whole. The sensor system 300 is also shown in more detail in FIG. 4. The sensor system 300 comprises a remote sensor 310 that is attached to a sensor base 320 through a sensor connector 312. In FIGS. 3 and 4, the sensor connector 312 is a physical wire (or bundle of wires). In other embodiments, the sensor connector 312 could be a wireless connection, such as a Bluetooth connection (the Bluetooth standard is managed by the Bluetooth Special Interest Group, Kirkland, Wash.). In one embodiment, the remote sensor 310 is an integrated micro-electro-mechanical systems (or MEMS) sensor that contains at least a 3-Axis accelerometer and a 3-axis magnetometer, such as the MPU-9250 MEMS device made available from InvenSense Inc. (San Jose, Calif.), a subsidiary of TDK (Tokyo, Japan). The MPU-9250 also contains a 3-axis gyroscope so as to provide a total of nine separate signals.

In FIG. 3, the remote sensor 310 is attached proximal to the mid-point of an external wall 102 of the appliance. In one example, the wall 102 might be the rear wall of the appliance 100. In some cases, the rear wall 102 will have an insulating or sound-deadening panel 104 attached thereto. Because the remote sensor 310 should be attached directly to this wall 102, FIG. 3 shows a hole 106 cut into the panel 104 exposing the surface of wall 102. In most cases, the wall 102 of the appliance will be part of the metal shell of the appliance 100. In one embodiment, the appliance wall 102 is a steel sheet attached to an internal steel frame at a variety of points around the perimeter of the wall 102. Because the sheet is attached at the periphery, the center of the wall 102 should exhibit a larger amount of vibration due to the internal movements and vibrations of the components 110, 112, 114.

It is possible that better signaling is received if the remote MEMS sensor 310 is attached to an interior of wall 102. While it may frequently be impossible to attach the remote sensor 310 to the interior of the appliance 100 after manufacture, in some cases such an attachment may be possible and preferred. It is also within the scope of the present invention to attach the remote sensor 310 to the interior of the appliance 100 during manufacturing of the appliance 100, and then simply provide a connector for the sensor connector 312 on the exterior wall 102 of the appliance 100.

In the preferred embodiment, the sensor base 320 receives power from a 110 or 220 volt AC power supply, such as through a plug 330 plugged into a household power outlet. The power input 330 passes through a current measurement circuit 332 to a power relay 334. The power relay 334 consists of an outlet that may be controlled (turned on and off) by logic within the sensor base 320. In other embodiments, the power relay outlet 334 may consists of a simple, always on power outlet. The purpose of providing the outlet 334 is to allow the appliance 100 to be plugged into the outlet 334 through a power cord 108. In this way, the current measurement circuitry (e.g., the current sensor) 332 of the sensor base 320 can monitor and track the power consumption of the appliance 100. In fact, in the embodiment shown in FIGS. 4 through 9, the current usage of the appliance 100 becomes another input signal that reflects the current state of operation of the appliance 100 and that is monitored by the sensor system 300.

In FIG. 3, the sensor base 320 is shown external to the appliance 100, with the power cord 108 of the appliance 100 running from the exterior of the appliance 100 to the power relay plug 334 of the sensor base 320. It is well within the scope of the present invention to incorporate the components of the sensor base 320 within the confines of the appliance cabinet. In such an embodiment, the only external power cord for the appliance 100 would provide power to the power input 330 of the sensor base 320. The power for the internal components 110, 112, 114 of the appliance 100 would run through the current monitor 332 of the sensor base 320, but would be hard-wired within the interior of the appliance 100. In this embodiment, the remote MEMS sensor 310 could also be mounted within the interior of the appliance 100, meaning that no external wiring or external mounting of sensors 310 would be required in order to add sensor system 300 to the appliance 100.

As shown in FIG. 4, the sensor base 320 also contains a direct current power supply 336 that provides DC power (such as 5-volt power) to all the digital circuitry of the sensor 300. For example, the power supply 336 powers the micro controller 340 that controls all aspects of the sensor 300. In one embodiment, the micro controller 340 takes the form of a programmed microprocessor, with programming for the microprocessor stored on a local memory device (not shown in FIG. 3). The micro controller 340 receives signals from the remote sensor 310 through an interface 314. The use of a sensor interface 314 with a MEMS sensor 310 is well-known in the industry. The micro controller 340 is responsible for receiving signals from the remote sensor 310 and the current measurement circuitry 332, for performing preliminary analysis to determine whether the signals are of interest, for preparing data about the signals for transmission, and the for sending the data to a Wi-Fi component 350 for transmission to a remote computer system. The Wi-Fi component 350 is also a standard Wi-Fi element, and is designed to provide wireless communications with a local router to allow for data transmission over a wide area network such as the Internet. The processes performed by the micro controller are described in more detail below.

Figure 5:
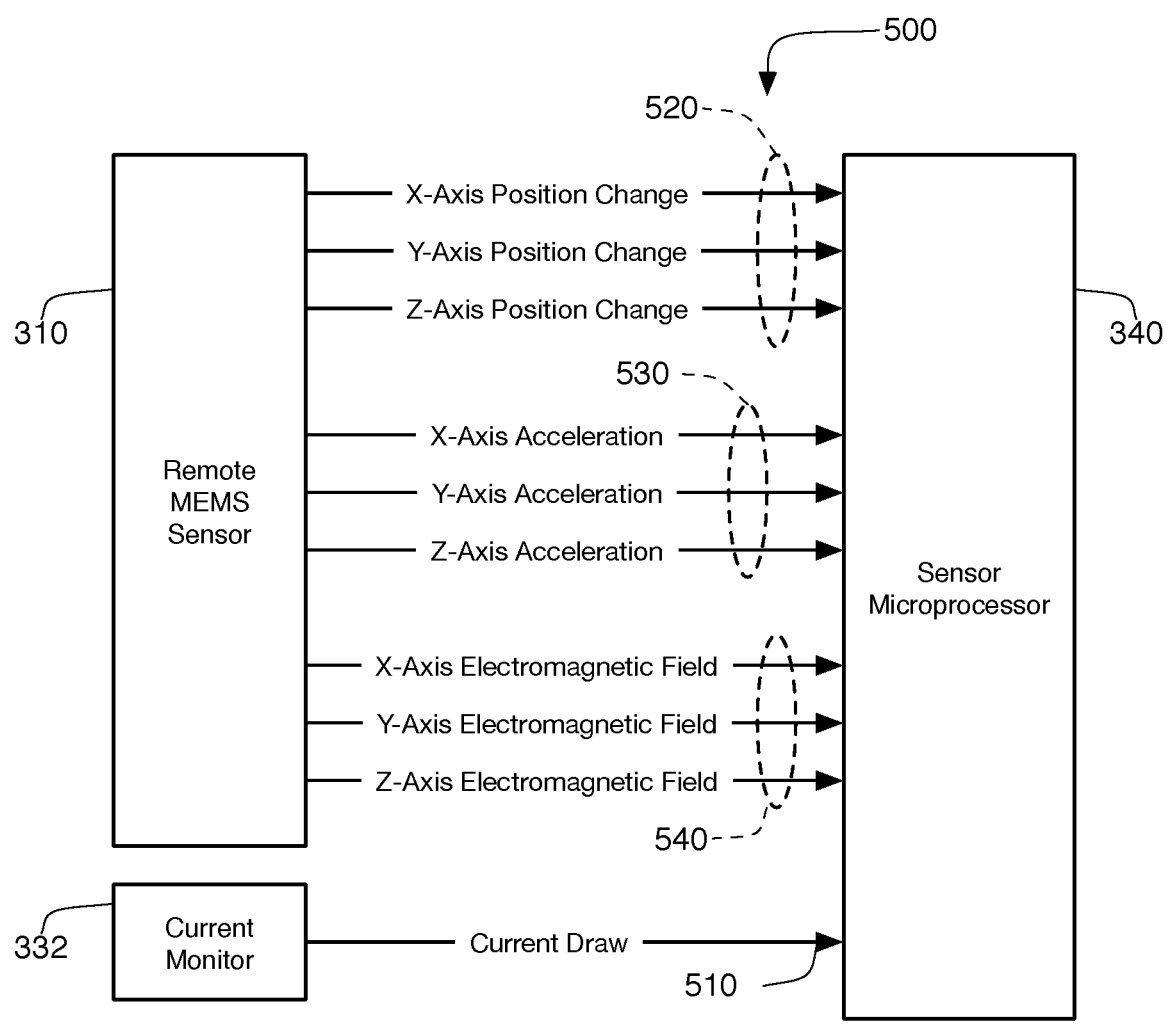
FIG. 5 is a schematic view showing the signals monitored by the sensing apparatus of FIG. 3.

In one embodiment, the micro controller 340 of the sensor base 320 analyzes ten different signals 500, as shown in FIG. 5. The current measurement circuitry provides a current draw signal 510 indicating the current draw of the appliance 100 at a particular time. The other signals 500 are received from the remote MEMS sensor 310. In FIG. 5, the remote sensor 310 provides separate data relating to angular position change 520 of the exterior surface 102 of the device 100, the acceleration 530 of the exterior surface 102 of the device 100, and the changes in the electromagnetic field 540 sensed proximate to the exterior surface 102 of the device 100. Each of these data types 510, 520, 530 is provided in three dimensions, meaning that a total of nine different data signals 510, 520, 530 are provided by the remote sensor 310.

System 600

Figure 6:
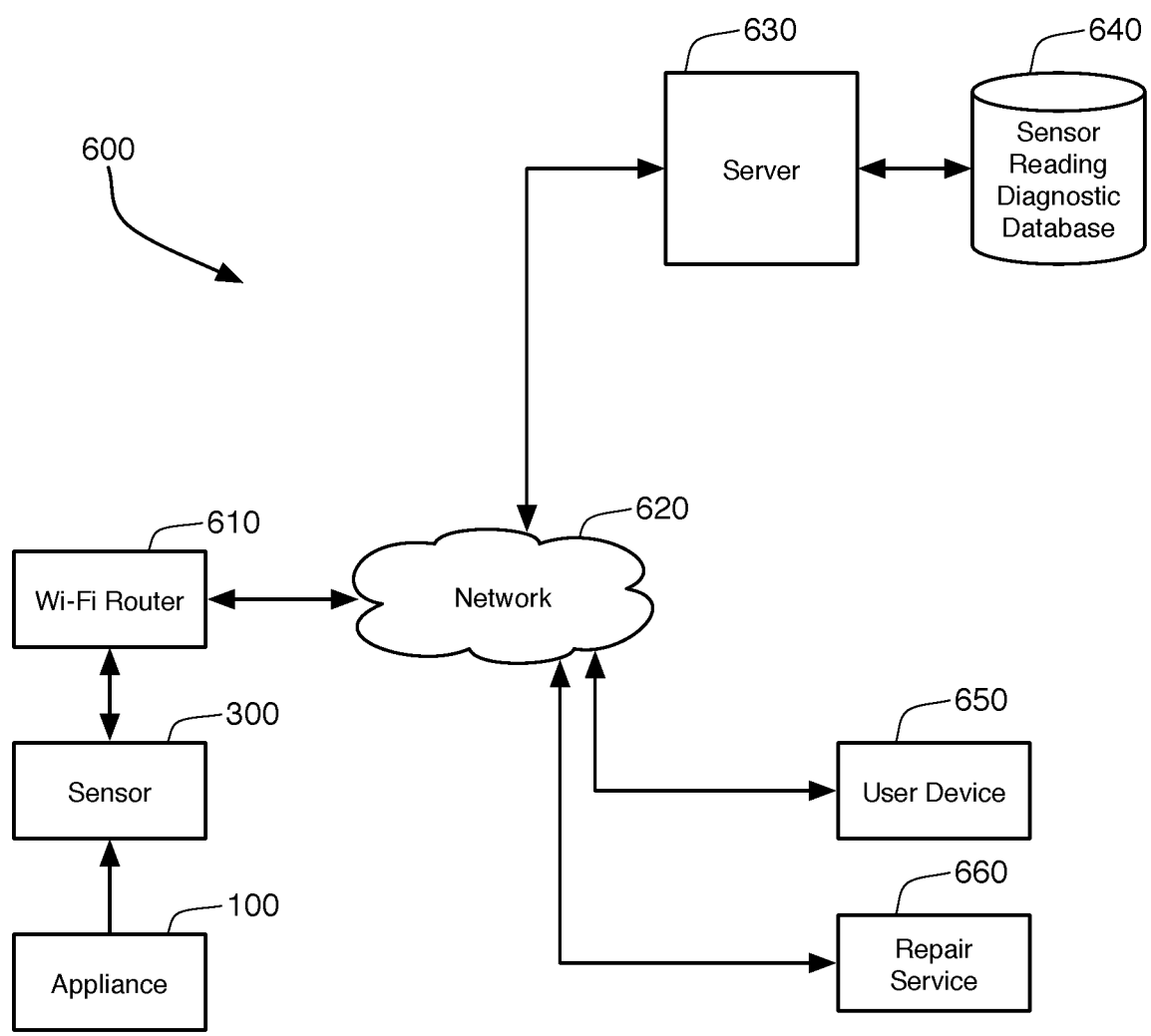
FIG. 6 is a schematic view of a system for monitoring the appliance of FIG. 1.

FIG. 6 shows a system 600 that utilizes the sensor 300 to monitor an appliance 100. In this system 600, the sensor 300 is positioned to monitor the appliance 100, such as through the use of a remote sensor 310 as shown in FIG. 3. The sensor 300 analyzes signals it receives concerning the operation of the appliance 100 and determines when it is appropriate to transmit data concerning those signals to a remote server 630. To transmit the data, the sensor 300 communicates over a Wi-Fi router 610 through its Wi-Fi component 350. The server 630 compares the data that it receives from the sensor 300 to a sensor reading diagnostic database 640. This database 640 is prepopulated with readings from other appliances like the appliance 100 being monitored. As explained in more detail below, the server 630 can analyze the signals to identify signals relating to particular components 110, 112, 114 in the appliance, and then compare the signals for a single component 110 against data in the database 640 relevant to the same component. Similar signals in the database 640 are identified and analyzed to determine whether the database 640 indicates that the signals received from the sensor 300 are predicting a failure of that component 110.

If signals are received that identify a failure (or predict the imminent failure) of a component 110, the server 630 sends a notification to a user device 650 and/or a repair service 660. The notification to the user device 650 will inform the user of the findings of the server 630, and may suggest that the user have the component 110 repaired or replaced. In some embodiments, the notification will be sent directly to a repair service 660, which will proceed to schedule and perform the component 110 repair/replacement.

Prepopulating the Diagnostic Database 640

Figure 7:
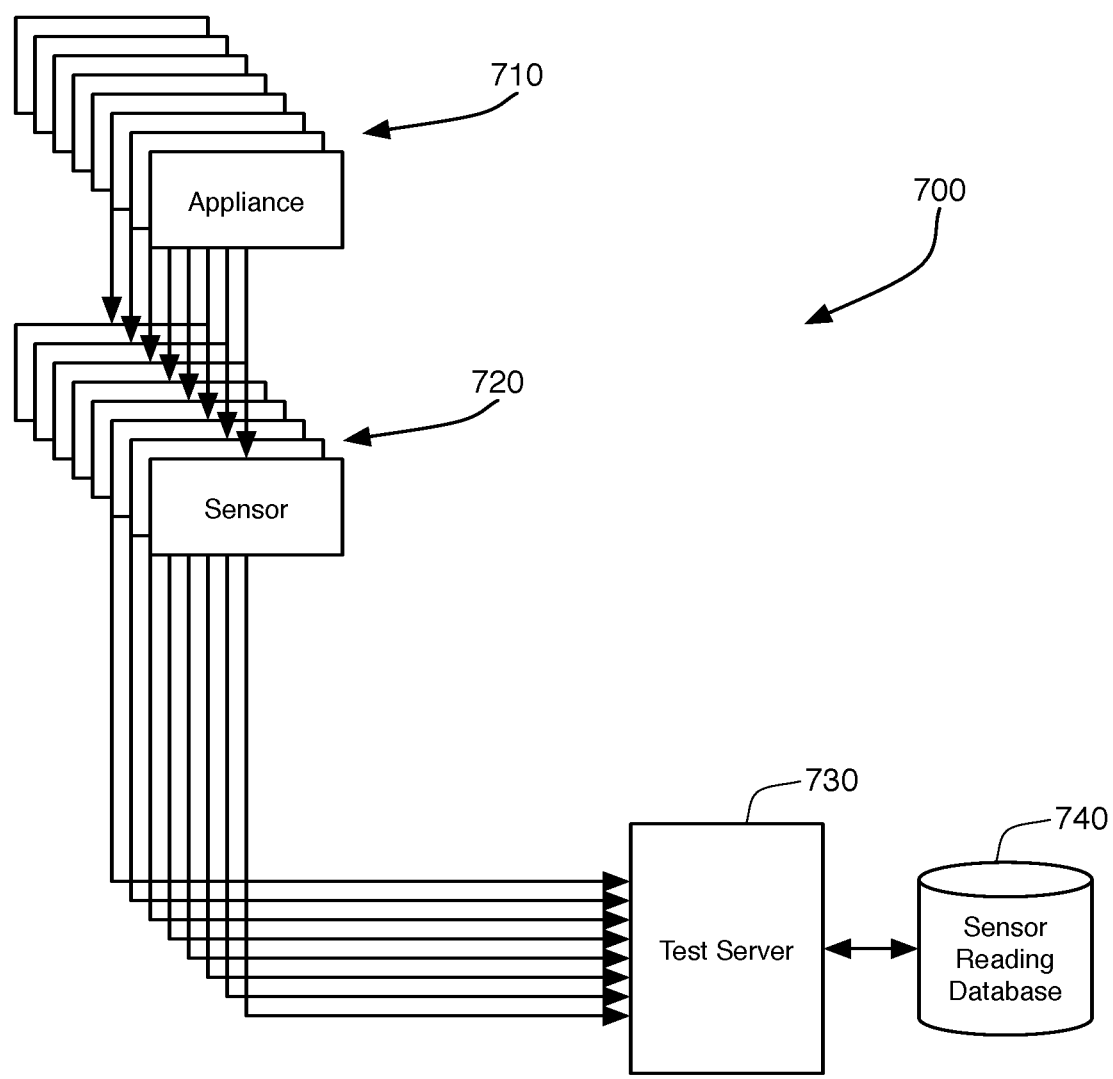
FIG. 7 is a schematic view of a system of multiple appliances and sensing apparatus for populating a sensor reading database.

In order for the server 630 to determine whether or not the signals received from the sensor 300 indicate that component 110 is potentially failing, the diagnostic database 640 accessed by the server 630 must have sufficient data related to the monitored appliance 100. FIG. 7 shows a system 700 that can be used to populate that database 640. In this system 700, a large plurality of appliances 710 similar or identical to appliance 100 are monitored by sensors 720. The appliances are allowed to operate, either in a testing environment or in actual use (such as a home environment for a home appliance). The sensors 720 are similar to sensor 300, in that they monitor the same signals 500 during operation of the appliance 710. These signals 500 are sent to a test server 730, either over a wide area network (similar to that shown in FIG. 6) or through a more direct connection (which would be useful in a test environment where multiple appliances 710 are operating in close proximity to one another). The test server 730 stores incoming data signals in a sensor reading database 740, and is responsible for analyzing the signals and noting changes in the signals.

If any of the components of one of the appliances 710 malfunctions, the test server 730 is notified of the failure. Signals received from the sensor 720 for the failed appliance 710 are retrieved from the database 740 and examined for that period which preceded the malfunction. The goal is to identify changes in the signal that indicate that a failure is about to occur, or that the failure has occurred. A single failure event for a single component of an appliance is not enough to establish a relationship between a signal change and a predicted failure. But if the same failure of a component across multiple appliances 710 is associated with the same signal change that preceded the failure, an association between that signal change and an upcoming or current failure of a component can be established within the sensor reading database 740. An identified association/correlation between failure events and signal changes can then be used to populate the diagnostic database 640, so that the same sensor reading change associated with the appliance 100 can be used to predict that failure in component 110.

Figure 8:
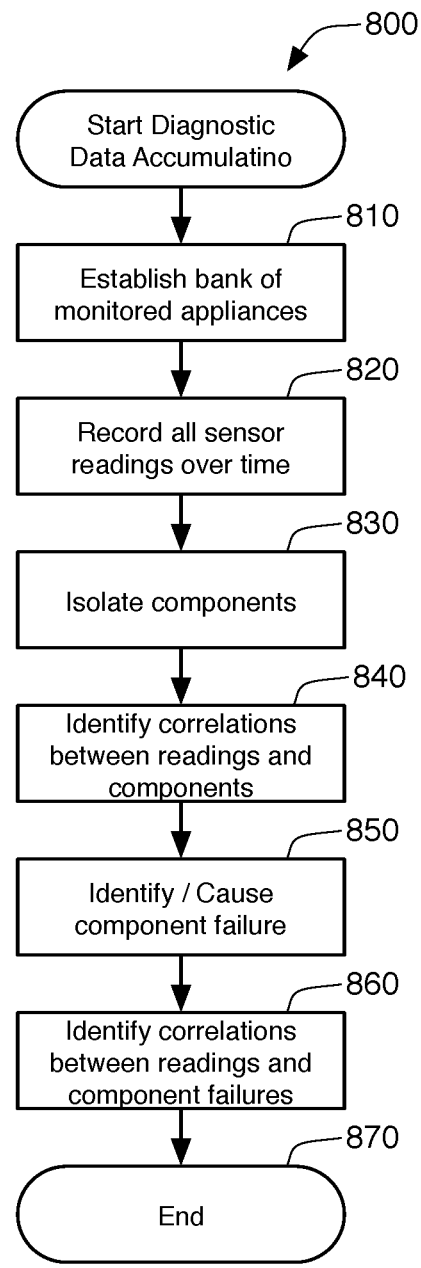
FIG. 8 is a flow chart showing a method of diagnostic data accumulation using the system of FIG. 7.
Figure 9:
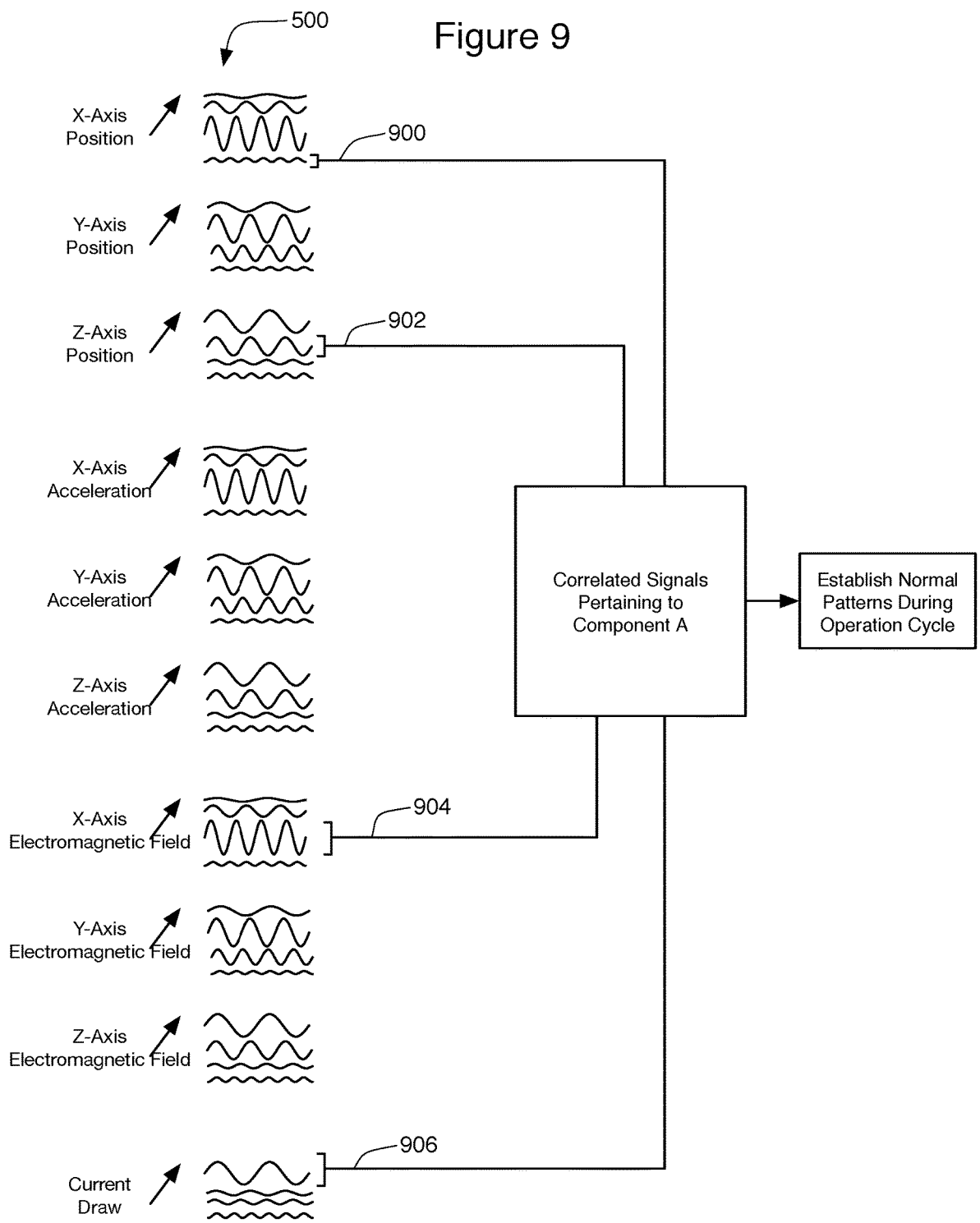
FIG. 9 is a schematic diagram shown wavelength elements in the monitored signals and their correlation with an appliance component.

FIGS. 8 and 9 illustrate a technique for analyzing signals 500 in the prepopulating environment 700. The method 800 shown in FIG. 8 starts at step 810 with establishing the bank of monitored appliances as shown in FIG. 7. This step 810 includes not only providing the appliances 710, but also ensuring that the appliances are being properly monitored by sensors 720, and that the sensors are providing sensor readings to the test server 730 for analysis. At step 820, the multiple appliances 710 are monitored over a long period of time sufficient for multiple failures of the major components to occur within the plurality of appliances 710. Some statistics shows that the mean time between failures ("MTBF") for some appliances (for a "low grade" of washing machine, for example), might be as low as six hundred hours, while other appliances may have an MTBF of more than ten thousand hours.

During the monitoring of the appliances 700, it is helpful to identify those portions of the received signals 500 that are indicative of the operation of a particular component 110, 112, 114 of the appliance. One potential way to do this is to isolate the operation of a single component of the appliance 700 and then monitor the signals 500. For example, appliance 100 could be modified so that only component 110 is operating. The signals 500 from the monitored appliance 100 could then be associated with that component. As mentioned before, most of the monitored components 110, 112, 114 are likely to create physical movements or vibrations. The vibrations of one component 110 during operation are likely to quite different than the vibrations of a second component 112. For instance, the vibrations of component 110 may be primarily in the X-axis (as monitored by remote sensor 310) while the vibrations of component 112 may be equally in the Y-axis and Z-axis. Furthermore, the frequency of the vibrations of component 110 may be higher than the frequency of the vibrations of component 112. Thus, it is necessary to examine not only each of the ten signals 610 being monitored when examining a component, but to also examine the separate frequency components of each of those signals. This is shown in FIG. 9.

FIG. 9 shows four different signals that are correlated by a test server 730 with the operation of component A110 in the test appliances 710. In order to simplify the explanation, FIG. 9 shows each of the ten signals 500 being broken down into only four distinct frequencies (as was explained above in connection with FIG. 2), with the highest frequency sub-signal being shown on the bottom and the lowest frequency sub-signal on the top. In a real environment, the number and range of frequencies that are considered for each of the signals 500 would be greater. In FIG. 9, the highest examined frequency of the X-Axis position signal 900 is one of the four signals associated with component 110, as is the third highest frequency of the Z-Axis position signal 902, the second highest frequency of the X-Axis magnetic field signal 904, and the lowest frequency of the current draw signal 906.

Step 840 of method 800 is the step that is responsible for identifying these correlations between the components of the signals 500 and individual components 110, 112, and 114 of the monitored appliances 710. The method for actually identifying these signals (such as signals 900, 902, 904, and 906 in FIG. 9) can use a variety of algorithms. For instance, as explained above, the component 110 being analyzed may be run in isolation, and these signals 900, 902, 904, and 906 may be the most apparent (largest magnitude) during the isolation test, or these signals 900, 902, 904, 906 may be the signals with the greatest amount of change when component 110 begins to operate in the context of all of the other components of the appliance 100. Furthermore, the signals 900-906 associated with a component 110 may only be understood as relevant after the failure of component 110 is identified and analyzed by the test server 730. For example, a Y-axis vibration of a certain frequency may not be associated with the component 110 when it is operating in a normal condition, but that Y-axis vibration may be pronounced before a certain type of failure of that component 110. In this case, that frequency of Y-axis vibration would be associated with that component in step 840.

In step 850, multiple component failures are identified by the test server 730, which prompts the test server 730 to examine the received signals 500 looking for alterations in the signals 500 that might be associated with an eminent component failure or as indicative of the actual failure of the component. Note that the component failures identified in step 850 may be naturally occurring during the operation of the appliances 710. Alternatively, it may be possible to cause a component failure by altering the conditions in which the appliance 710 is operating. Dust, debris, and grime, for example, and be inserted into the interior of an appliance to simulate conditions that would occur usually only after years of use. In another example, a component known to be in the process of failure may be inserted into one of the appliances 710 to trigger a failure during the monitoring process 800. Regardless of whether the component failure is natural or artificially induced, step 860 will analyze the signals associated with the failed component to identify signal changes indicative of the failure. In the beginning of the data accumulation process 800, failures will be rare and identified signal changes may only be hypothetically connected with the failure. But repeated analysis of similar/identical failures will allow the test server 730 to isolate those signal changes that consistently predict future failures of the components or are consistently indicative of the actual failure of the components. The method 800 then ends at step 870, with sufficient data having been accumulated to populate the run-time diagnostic database 640.

Diagnostic Monitoring

Once the database 640 is populated, the system 600 is ready to monitor appliance 100. One method 1000 for monitoring is set forth in FIG. 10. This method 1000 begins with step 1005, in which the sensor base 320 receives signals 520, 530, 540 from the remote MEMS sensor 310 and signal 510 from current monitor 332. This can be accomplished by attaching the remote MEMS sensor 310 to the exterior wall 102 of the appliance 100 (as illustrated in FIG. 3), or by mounting the sensor 310 and/or the entire sensor system 300 within the interior of the appliance 100 (as described above). At step 1010, these signals 500 are divided into separate frequency elements, such as through a fast Fourier transform technique. In one embodiment, the FFT is performed by a digital signal processing (DSP) chip found in the sensor base 320, as commercially available DSPs commonly provide Fourier transformation services. At step 1015, the micro controller 340 analyzes the individual frequency elements to look at changes in the signal over time. It is only these changes in the signals that must be transferred to the server 630, as an unchanging signal does not provide any meaningful data for analysis. If only delta changes are transmitted to the server 630, it is likely that baseline information relating to all of the signals 510, 520, 530, 540 being received will be transmitted once to the remote server 630 so that the server 630 will have information about the normal behavior of the appliance 100 in its current environment.

To identify changes in the signals 510, 520, 530, 540, the micro controller 340 may store information about each frequency element in the signals 500 so that these prior data points can be compared against newly received signals 500. If a change is identified, the stored information will be updated to reflect this change. Delta changes in the signals 500, once identified, are then transmitted to the server 630. In one embodiment, this is accomplished by first compressing signal change information at the sensor base 320 (step 1020), and then transmitting the compressed sensor change information at step 1025. As explained above, the transmission likely occurs over a Wi-Fi component 350 of the sensor base 320, passing through a Wi-Fi Router 610 in the home and then over a WAN such as the Internet 620. This transmission will likely include a unique identifier for the sensor 300, which the server 630 can use to identify the exact appliance 100 being monitored (both its make and model, as well as information about the location and owner of the appliance). This type of data is likely pre-populated in an appliance database accessible by the server 630. Note that the steps 1005-1025 located on the left-hand side of FIG. 10 are shown in a dashed box labeled "At Sensor" since these steps take place at sensor 300.

The sensor change information is received by the server 630 at step 1030, which will then decompress this data at step 1035. After decompression, the server will then analyze the signals to see which components might be responsible for the changed signal information. This is accomplished by examining the information in the database 640 about the appliance 100 and its individual components 110-114. The correlations between signals 500 (and their frequency sub-elements—such as signals 900-906) and components 110-114 of the appliance 100 are pre-determined, as explained above in connection with FIG. 9. The received signal changes (and any information that the server 630 had about previous sensor readings for the appliance) are then compared with the information in the diagnostic database 640 at step 1045. This step is looking for similar data characteristics between the signal data and the data in the database 640, such as an increased amplitude or intensity of a signal at a certain frequency, or the correlation of two such amplitude increases across different signals.

At step 1050, an abnormality that indicates an impending failure of a component is detected based on the results of step 1045. Alternatively, the abnormality may indicate that a component failure has already taken place. At this point, the server will notify the appliance owner through a message to a user device 650 that is associated with the appliance 100 (step 1055). The method 1000 may also notify a repair service provider 660 appropriate for that appliance 100 (step 1060) indicating that a component 1010 of appliance 100 needs to be replaced. When step 1050 indicates that a component is about to fail, the repair service provider 660 is able to go to the appliance and repair or replace the soon-to-fail component 110 before the component 110 actually fails (step 1065).

Figure 10:
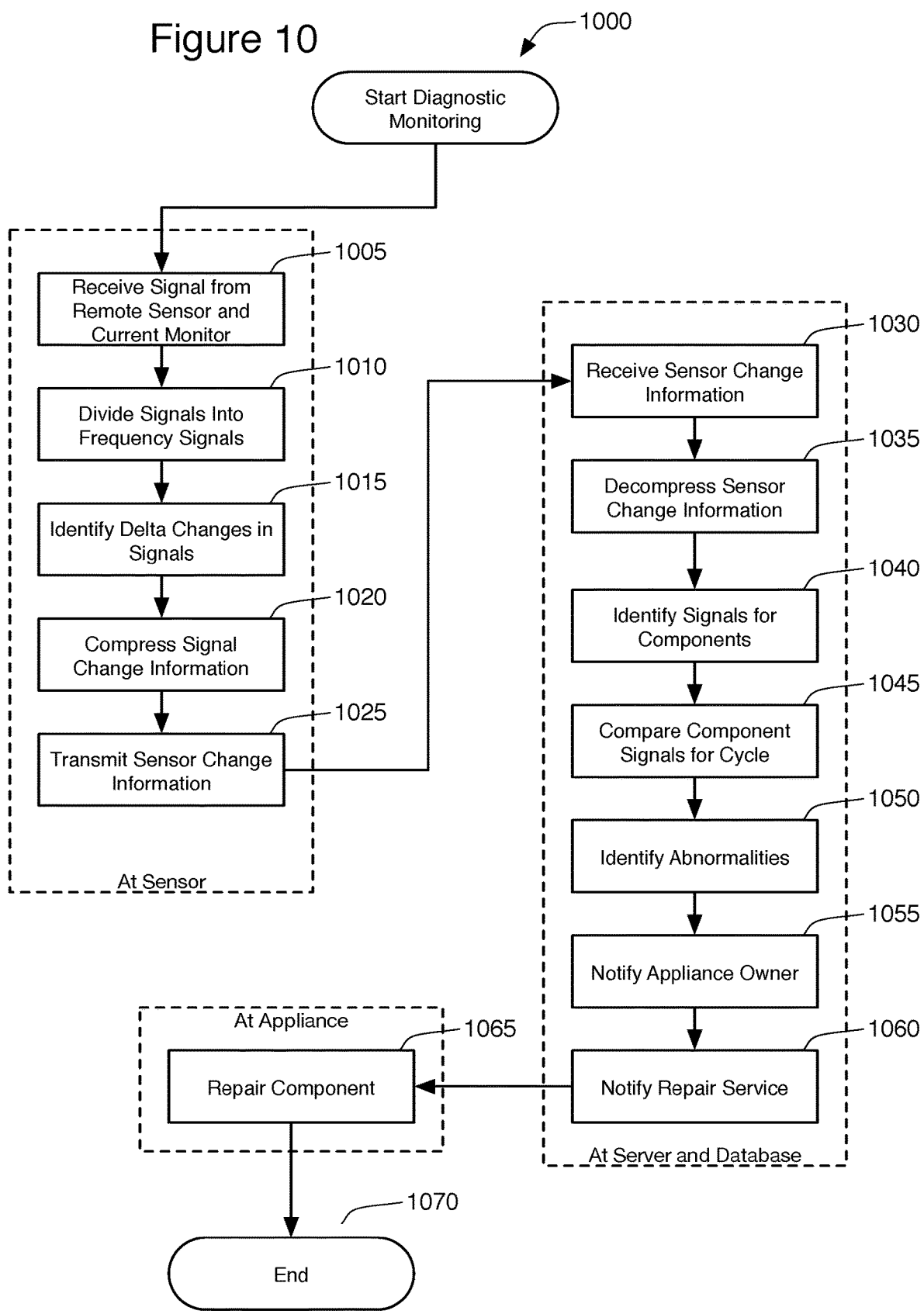
FIG. 10 is a flow chart showing a method of monitoring and repairing an appliance.

Steps 1030 through 1060 are located on the right-hand side of FIG. 10 within the "At Server and Database" dashed box to indicate where these steps are performed. Step 1065 is located in an "At appliance" box because the repair will occur at the appliance. After step 1065, the method 1000 will end at step 1070.

A purchaser of the appliance 100 may purchase the monitoring and repair of the components 110, 112, 114 of the appliance 110 as a service, either from the retailer of the appliance or from a separate service provider. By detecting components 110 that are about to fail, the service can keep an appliance 100 running longer without any failures that completely stop the operation of the appliance 100.

Cycles and Timing

As explained above, method 1000 is able to identify irregular current and sensor readings 500 that might indicate an imminent failure of a component or that indicate a component has already failed. In one embodiment, this determination is always made in the context of the current "appliance cycle" or state of the appliance. A refrigerator that is entering into a defrost cycle or an ice-making cycle, for instance, may produce vibration, EM field fluctuations, or current readings 500 that are different than before entering into that cycle, but are nonetheless normal signals 500.

As a result, it is useful to perform method 1000 with an awareness of the current cycle of the appliance 100. If the server 630 has knowledge of the current cycle or of cycle changes made by the appliance, then the comparison of step 1045 can be performed with the knowledge of the appliance's current cycle. Consequently, at least one embodiment of the present invention has the sensor microcontroller 340 communicating with the electronics of the appliance 100 to identify the current status or cycle of the appliance 100. This information is then forwarded on to the server 630 by the sensor system 300 whenever data is being transmitted. In other embodiments, the server 630 uses the signals 500 it receives from the sensor system 300 to determine the cycle changes, and then uses this cycle information to analyze the remaining details in the signals 500 for component failure information. In still further embodiments, the micro controller 340 in the sensor base 320 uses its own knowledge of cycle changes to ignore delta changes in the signals at step 1015 that are merely indicative of a cycle change.

In some embodiments, the duration of pre-defined cycles in the appliance 100 becomes another input into the analysis performed by method 1000. It is possible for the sensor base 320 to monitor the duration of cycles within the appliance 100 and then forward aberrant duration timings to the server 630 whenever they are detected. Alternatively, the server 630 can record cycle durations as part of its process of identifying the current cycle of the appliance 100. Regardless of where cycle duration, this information can be used to analyze the performance of components 110-114. For example, the server 630 may determine that an abnormally long cycle duration in an appliance 100, when coupled with both an unusually large current draw and periodic Y-axis motion, indicates that component A110 is about to fail.

Alternatively, the server 630 may identify a cooling cycle in a refrigerator by detecting particular X- and Y-axis vibrations and a large current draw. When the vibrations stop and the current draw reduces, the cycle will be considered complete. The server 630 may record cooling cycle durations over time and then use changes in the cooling cycle duration along with changes in the signals 500 to identify that component B112 is soon-to-fail.

Alternative Embodiment System 1100

Figure 11:
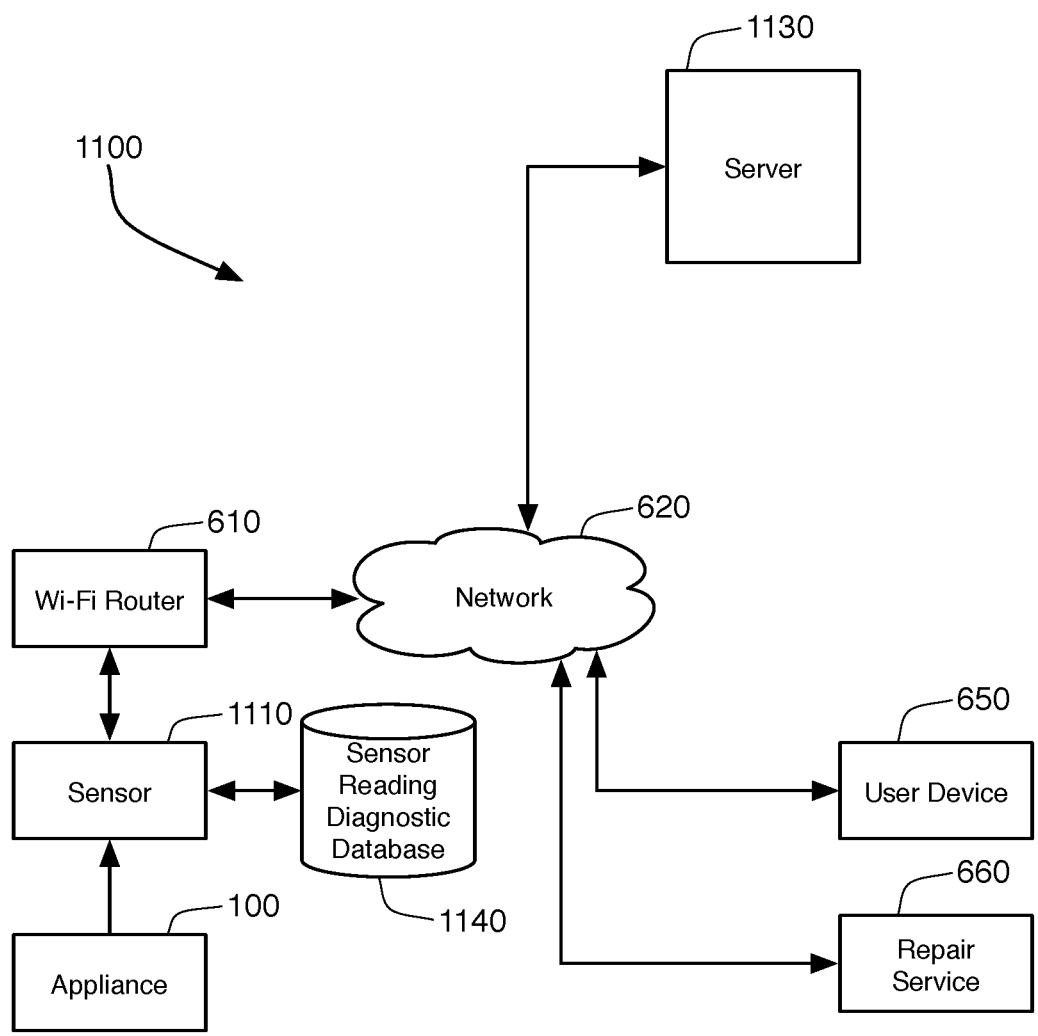
FIG. 11 is a schematic view of an alternative system for monitoring the appliance of FIG. 1.

FIG. 11 shows an alternative embodiment of system 1100 that is similar to system 600 of FIG. 6, except that sensor system 1110 does not need to rely upon server 630 to compare signals against the sensor reading diagnostic database 640. Instead, system 1100 stores a local copy of this database 1140 within the sensor system 1110 (or at least local to the sensor system 1110 at the appliance location). Because this database 1140 is directly accessible to the sensor system 1110, system 1100 performs steps 1030 through 1050 of method 1000 at the sensor system 1110 rather than the server 600. Once the sensor system 1110 identifies an actual abnormality at step 1050, the sensor 1110 will report this abnormality to the server 1130. The server 1130 is responsible for storing this reported abnormality, and then reporting the abnormality to the user device 650 and repair server 660 that are associated with this appliance/sensor system 1110 (steps 1055 and 1060). In this way, a customer/user database and a repair service contact can be centrally stored at the server 1130 and can be easily updated at the server 1130, while the sensor system 1110 can concentrate on identifying abnormalities in the signals 500 and cycle times.

In this system 1100, the sensor reading diagnostic database 1140 can be pre-programmed into the sensor system 1110. Alternatively, the sensor system 1110 can be programmed to periodically download and update its locally stored diagnostic database 1140 to ensure that the sensor system 1110 has access to the latest data concerning component failures and the telltale signals 500 and cycle times that predict or identify such failures.

Sound

It is also possible to incorporate a microphone into the remote MEMS sensor 310 so that a sound signal is added to the other signals detected at step 1005. The sound signals can also be divided into frequency signals at step 1010, and then can be included as part of the correlation of signals to particular components (see FIG. 9) and the identification of potential failures. In the present embodiment, sound is not used alone to analyze the functioning of a component. Rather, sound is used as only one signal, and in only combination with the physical movement detection (position/velocity/acceleration), EM field detection, and/or current draw signals that are described above.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A sensor system for an appliance comprising:
   a) a current monitor that monitors a current draw for the appliance during operation,
   b) a physical movement sensor that senses a physical movement of the appliance,
   c) a processor programmed to
      i) receive current data from the current monitor,
      ii) receive physical movement data from the physical movement sensor,
      iii) determines cycle duration data for cycles of the appliance, and
      iv) compare the current data, the physical movement data, and the cycle duration data against a previously created diagnostic database to identify a potential component failure exhibiting similar current data and physical movement data characteristics.

2. The sensor system of claim 1, wherein the processor is further programmed to:
   v) communicate the potential component failure to a computing device associated with the appliance.

3. The sensor system of claim 1, further comprising a remote sensor containing the physical movement sensor, and a sensor base containing the current monitor.

4. The sensor system of claim 3, wherein the remote sensor further contains an electromagnetic field sensor that monitors an electromagnetic field of the appliance, further wherein the processor is programmed to receiving electromagnetic field data from the electromagnetic field sensor, and further wherein the processor is programmed to compare the electromagnetic field data along with the current data, the physical movement data, and the cycle duration data against the previously created diagnostic database.

5. The sensor system of claim 3, wherein the remote sensor is attached to a physical wall of the appliance.

6. The sensor system of claim 5, wherein the remote sensor is attached to an exterior surface of the physical wall.

7. The sensor system of claim 1, wherein the physical movement data comprises three axes of position change data and three axes of acceleration data.

8. The sensor system of claim 1, wherein the current data and the physical movement data are communicated to a server containing the processor over a wide area network from a sensor base located proximal to the appliance.

9. The sensor system of claim 1, wherein the previously created diagnostic database was populated by testing a plurality of similar appliances using similar current monitors and similar physical movement sensors and identifying failures of components in the plurality of similar appliances during the testing.

10. A method for detecting the failure of a component of a device comprising:
    a) at a sensor system, receiving current data from a current monitor measuring the current draw of the device;
    b) at the sensor system, receiving physical movement data from a physical movement sensor measuring the physical movement of an exterior surface of the device;
    c) at the sensor system, receiving electromagnetic field data from an electromagnetic field sensor measuring the electromagnetic field generated by the device;
    d) at the sensor system, identifying changes in the current data, the physical movement data, and the electromagnetic field data;
    e) at the sensor system, transmitting the identified changes to a server computer;
    f) at the server computer, receiving the identified changes; and
    g) at the server computer, comparing the identified changes against previously created diagnostic data to identify a potential component failure exhibiting similar changes.

11. The method of claim 10, further comprising the step of identifying cycle durations for the device and comparing changes in cycle duration along with the identified changes against the previously created diagnostic data.

* * * * *